(12) United States Patent
Fryska et al.

(10) Patent No.: US 7,090,057 B2
(45) Date of Patent: Aug. 15, 2006

(54) COMPOSITE FRICTION DISC WITH STRUCTURAL CORE AND REFURBISHABLE LINING ELEMENTS

(75) Inventors: Slawomir T. Fryska, Granger, IN (US); Anthony Scelsi, South Bend, IN (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/873,698

(22) Filed: Jun. 4, 2001

(65) Prior Publication Data
US 2002/0179382 A1 Dec. 5, 2002

(51) Int. Cl.
*F16D 55/36* (2006.01)

(52) U.S. Cl. .................. 188/71.5; 188/73.1; 188/18 A; 188/251 A; 188/218 XL

(58) Field of Classification Search ............... 188/73.1, 188/250 E, 261, 250 B, 250 G, 218 XL, 188/71.5, 73.2, 18 A, 251 A, 251 R, 251 M, 188/250 ALL; 192/70.14, 107 R, 107 M; 29/401.1
See application file for complete search history.

(56) References Cited

U.S. PATENT DOCUMENTS

| | | | | |
|---|---|---|---|---|
| 2,013,948 A | * | 9/1935 | Carew | .................. 188/250 A |
| 2,778,451 A | | 1/1957 | Friedman | |
| 3,403,760 A | | 10/1968 | Caskey | |
| 3,433,334 A | | 3/1969 | Kershner | |
| 3,621,945 A | | 11/1971 | Spry et al. | |
| 3,708,042 A | | 1/1973 | Krause et al. | |
| 3,712,427 A | | 1/1973 | Cook et al. | |
| 3,724,612 A | | 4/1973 | Spain | |
| 3,759,353 A | * | 9/1973 | Marin | |
| 3,800,392 A | | 4/1974 | Cook et al. | |
| 3,917,043 A | | 11/1975 | Bok | |
| 3,956,548 A | * | 5/1976 | Kovac et al. | ............... 428/66.2 |
| 4,011,055 A | * | 3/1977 | Hill et al. | ............... 188/251 A |
| 4,429,770 A | | 2/1984 | Weisbrod | |
| 4,613,017 A | | 9/1986 | Bok | |
| 4,742,895 A | | 5/1988 | Bok | |
| 4,804,071 A | | 2/1989 | Schultz et al. | |
| 4,982,818 A | | 1/1991 | Pigford | |
| 4,991,697 A | * | 2/1991 | Hummel et al. | |
| 5,005,676 A | | 4/1991 | Gassiat | |

(Continued)

FOREIGN PATENT DOCUMENTS

DE            19706123      *     8/1998

(Continued)

OTHER PUBLICATIONS

Translation of FR 2693246.*

*Primary Examiner*—James McClellan
*Assistant Examiner*—Mariano Sy
(74) *Attorney, Agent, or Firm*—Birch, Stewart, Kolasch & Birch, LLP

(57) ABSTRACT

A friction disc assembly having an annular structural core (40) and at least one friction lining disc (30). The annular structural core (40) is made from a strength-optimized carbon carbon composite and the friction lining discs (30) from a friction-optimized carbon carbon composite. Each friction lining disc (30) is provided with a mounting surface (31) and a wear surface (32). The structural core (40) includes at least one mounting surface (41). The mounting surfaces (31,41) may include corresponding sinusoidally-shaped wave patterns for increasing the surface area of a contact zone between the friction lining discs (30) and a reusable structural core (40).

12 Claims, 4 Drawing Sheets

U.S. PATENT DOCUMENTS

| | | | |
|---|---|---|---|
| 5,097,932 A | * | 3/1992 | Flotow et al. |
| 5,099,960 A | | 3/1992 | Alev |
| 5,558,186 A | | 9/1996 | Hyde et al. |
| 5,647,466 A | * | 7/1997 | Umezawa |
| 5,709,288 A | | 1/1998 | Riebe |
| 5,769,185 A | | 6/1998 | Main et al. |
| 5,779,006 A | | 7/1998 | Hyde et al. |
| 5,803,210 A | | 9/1998 | Kohno et al. |
| 6,105,234 A | * | 8/2000 | Kremsmair et al. |

FOREIGN PATENT DOCUMENTS

| | | | |
|---|---|---|---|
| EP | 1094236 | * | 4/2001 |
| FR | 2 326 623 A1 | | 6/1977 |
| FR | 2693246 | * | 1/1994 |
| GB | 2 085 098 A | | 4/1982 |
| GB | 2148187 | * | 5/1985 |
| GB | 2 191 830 A | | 12/1987 |
| JP | 55152108 | * | 11/1980 |

* cited by examiner

COMPOSITE FRICTION DISC WITH STRUCTURAL CORE AND REFURBISHABLE LINING ELEMENTS

TECHNICAL FIELD AND INDUSTRIAL APPLICABILITY OF THE INVENTION

The present invention is generally directed to carbon friction discs, and more particularly to a carbon friction disc for an aircraft brake designed to provide structural integrity, adequate frictional contact and sufficient heat absorption.

BACKGROUND OF THE INVENTION

Aircraft brakes typically include a plurality of stator discs and rotor discs which are compressed together during the braking operation of an aircraft. The stator discs and rotor discs are normally arranged in alternating fashion in order to form a brake disc stack The stationary, stator discs of the disc stack are arranged in a non-rotating position surrounding an aircraft wheel or shaft. The rotating, rotor discs are secured to an outer periphery of the aircraft wheel or shaft and are normally free to rotate with the aircraft wheel when the brake is not in use.

A brake housing may include a plurality of pressure piston actuators that are arranged to provide the compressive, braking force that forces the stator discs and rotor discs of the aircraft brake's disc stack together. Brake adjustors may be employed within the brake to provide adjustment of the relative positions of the brake discs as these frictional components become worn during brake usage.

Carbon brake discs for the aforementioned aircraft braking systems are well known in the background art. Carbon brake discs offer substantial advantages relating to thermal properties and wear over other brake discs of the background art. The carbon—carbon composite materials are expected to perform at least three different functions in an aircraft brake: structural, frictional and heat absorption, e.g. serve as a heat sink. However, it is difficult to simultaneously optimize all three requirements.

U.S. Pat. Nos. 3,712,427 and 3,800,392 describe refurbishable, carbon and/or graphite brake discs having removable wear face plates. As carbon or graphite brake discs become damaged or worn, the entire assembly of brake discs may have to be replaced in order to ensure the structural integrity of the brake system and/or to maintain the original dimensions of the brake stack.

The brake discs may be machined to incorporate an annular core plate with relatively thin wear plates of carbon based friction materials forming the frictional contact surfaces of the core plates. These wear plates are either bonded or mechanically secured to the annular core plates through well-known means such as rivets, or screws. Accordingly, these types of removable wear faces offer cheaper alternative methods to refurbish and repair brake disc wear faces.

U.S. Pat. Nos. 5,558,186 and 5,779,006 to Hyde et al., describe friction discs having renewable wear faces for facilitating cost effective, refurbishment and replacement of stator and rotor discs. These friction disc assemblies include an annular structural carrier including a plurality of recessed regions having walls and torque drive notches spaced around the circumference of the carrier.

A friction lining having a flat wear face and a obverse face including raised areas for matingly engaging the walls of recessed regions of the carrier is also provided in the disc assembly. Hyde et al. describe that the depth of the recessed regions may even be less than the corresponding height of the raised areas of the friction lining. For example, FIG. 4 and FIG. 5 of U.S. Pat. No. 5,558,186 show a carrier including a plurality of recessed regions in the form of windows devoid of any material.

However, as seen in these aforementioned examples of the background art, the desired transfer of forces between the friction lining and carrier can require complex manufacturing steps. For instance, the corresponding, mating components of the brake disc assemblies may necessitate several machining steps to create the radial, circumferential and tangentially oriented components that form the assembly.

Therefore, there is a need for a simple, aircraft brake disc assembly with separate friction and core parts where the torque is transferred directly from the friction component to the core. That way the core could be optimized for strength and the friction parts can be optimized for friction/wear performance.

SUMMARY OF THE PRESENT INVENTION

The present invention overcomes the shortcomings associated with the background art and achieves other advantages not realized by the background art.

The present invention, in part, is a recognition that a refurbishable brake disc assembly having a simplified construction would be highly advantageous in the related art.

The present invention, in part, is a recognition that uneven wear patterns between adjacent disc assembly components will result in dynamic instability. Accordingly, the present invention provides an aircraft brake disc assembly having dynamic stability.

The present invention, also in part, is a recognition that it is more desirable to facilitate the transfer of compressive braking forces directly between a friction lining element and a carrier than indirectly through surrounding structure and fasteners. Further, the transfer of braking forces through a relatively large surface area of the frictional elements will provide improved structural integrity, longer component life and reliable braking operations. Therefore, the present invention optimizes the transfer of compressive forces between friction linings and their associated carriers.

The present invention, in part, provides corresponding sinusoidal wave patterns on both the core and the friction elements of a brake disc.

The present invention, also in part, provides a friction disc for a brake assembly comprising an annular structural core having at least one sinusoidally-shaped mounting surface; and at least one frictional lining element having a sinusoidally-shaped mounting surface and a relatively, flat wear surface, the mounting surface of each frictional lining element matingly engaging the mounting surface of the structural core.

The present invention, also in part, provides a friction disc for a brake assembly comprising an annular structural core having at least one mounting surface having a plurality of recesses; and at least one frictional lining element having a mounting surface and a relatively flat wear surface, the mounting surface of each frictional lining element having a plurality of dimples formed for matingly engaging the plurality of recesses of the structural core.

Advantages of the present invention will become more apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF THE PREFERRED EMBODIMENTS

The present invention will now be described in detail with reference to the accompanying drawings.

Figure 1:
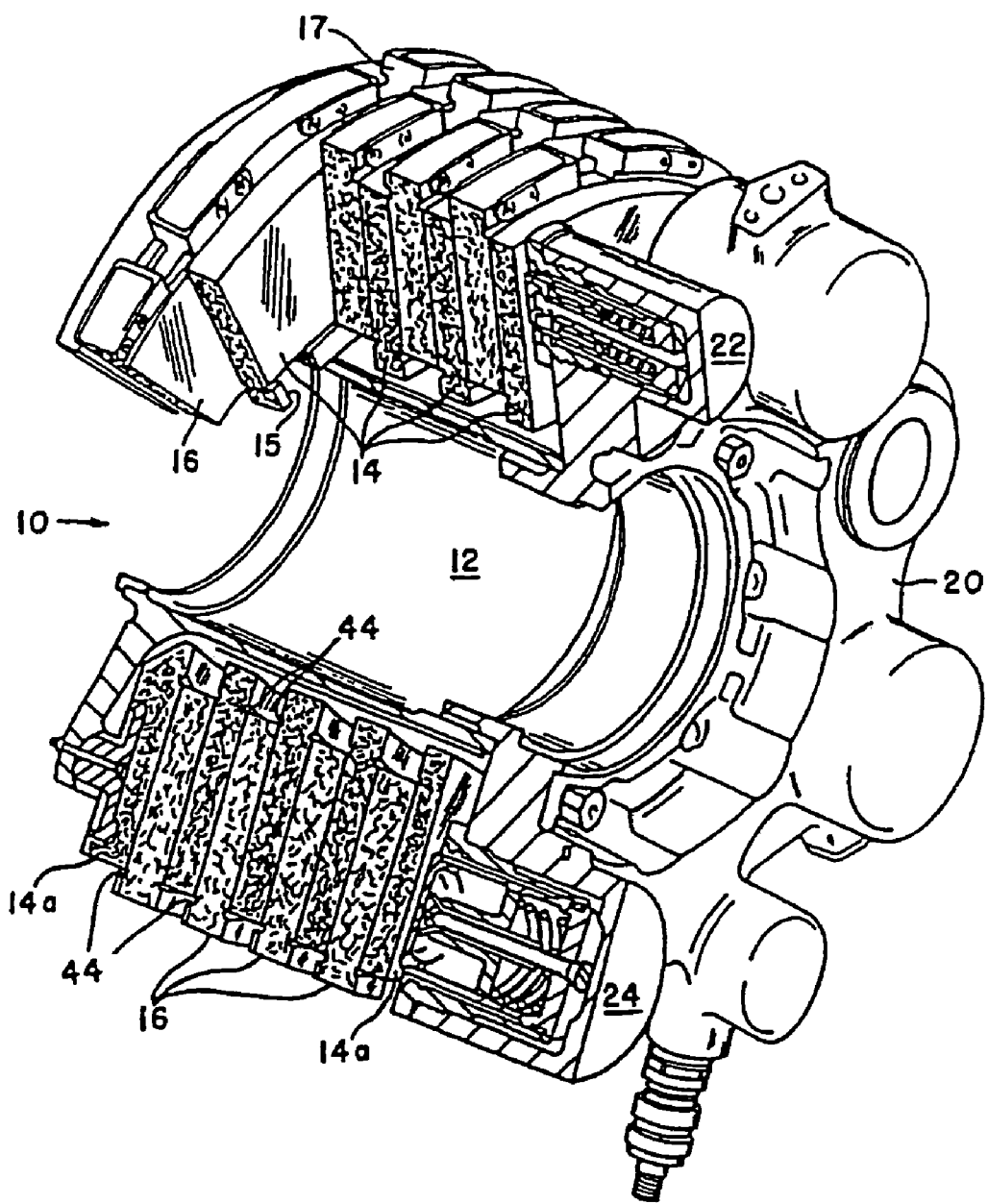
FIG. 1 is a partial, sectional view of an aircraft brake assembly incorporating an embodiment of the present invention.

FIG. 1 is a partial, sectional view of an aircraft brake assembly which could incorporate an embodiment of the present invention. An aircraft brake assembly is shown generally by numeral 10. The brake assembly 10 includes a torque tube 12 attached to an axle of an aircraft wheel (not shown) extending therethrough.

A disc stack is formed by the alternatingly, arranged stator 14 and rotor discs 16. A plurality of annular, stationary, stator discs 14 are attached to the torque tube 12 in a well known manner, such as drive lugs. A plurality of correspondingly shaped rotating, rotor discs 16 are arranged, in a well known manner, in an alternating fashion between stator discs 14. The rotor discs 16 are each attached at radially outer peripheries to the wheel (not shown) that is typically disposed concentrically about the torque tube 12. Axially inner and outer stators 14a are arranged at opposite ends of the disc stack and may serve as pressure plates for containing the disc stack.

The brake 10 further includes a housing 20 containing pressure piston devices 24 for compressing the stack of discs 14 and 16. A plurality of brake adjustors 22 may be provided for varying an adjusted initial position of the discs as they become worn. Stator slots 15 and rotor slots 17 may be provided for attachment of their respective discs to the torque tube 12 and aircraft wheel. For the present invention, drive lugs are typically arranged on an inner diameter of the structural core 40 (see FIG. 4) for mounting to a stator of the brake assembly. Alternatively, drive lugs arranged on an outer diameter of the structural core 40 for mounting to a rotor of the brake assembly may also be provided.

Figure 2:
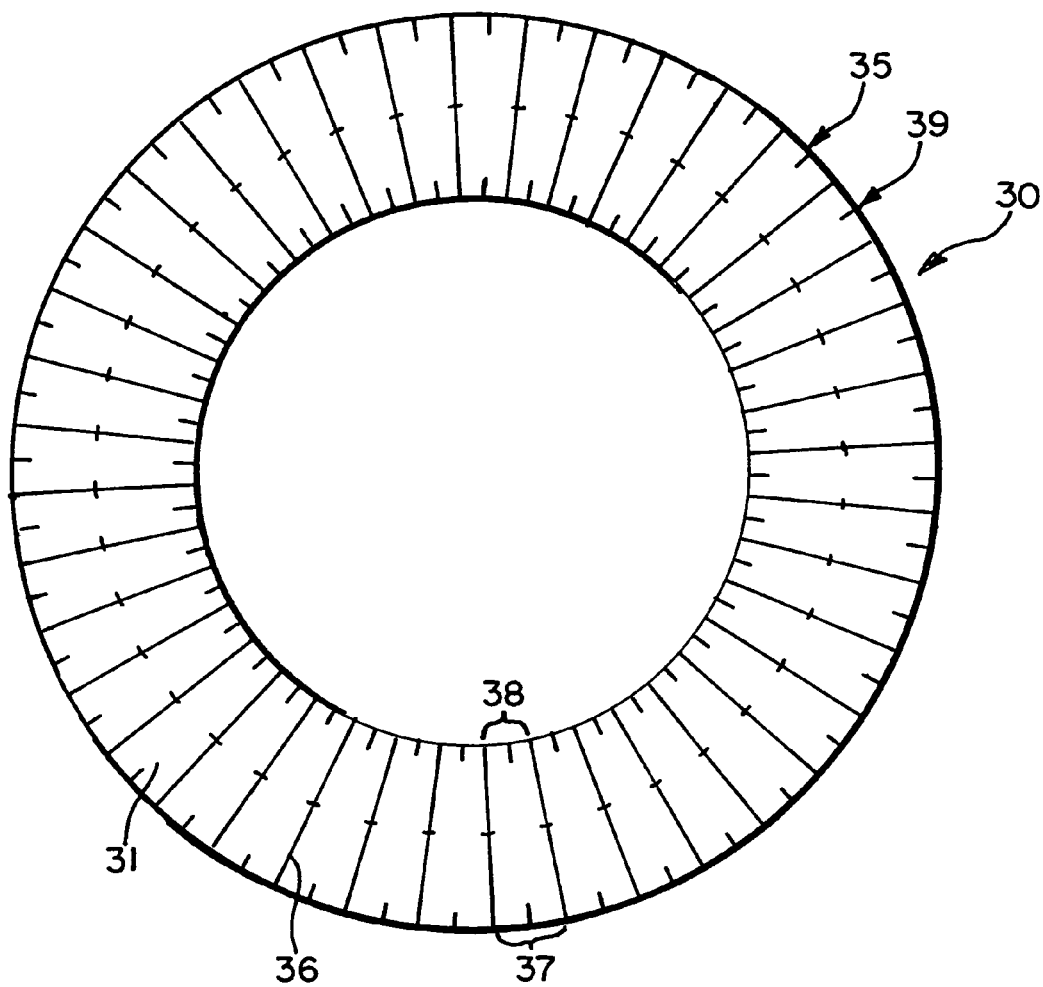
FIG. 2 is plan view of a sinusoidally shaped friction lining according to an embodiment of the present invention.
Figure 3:
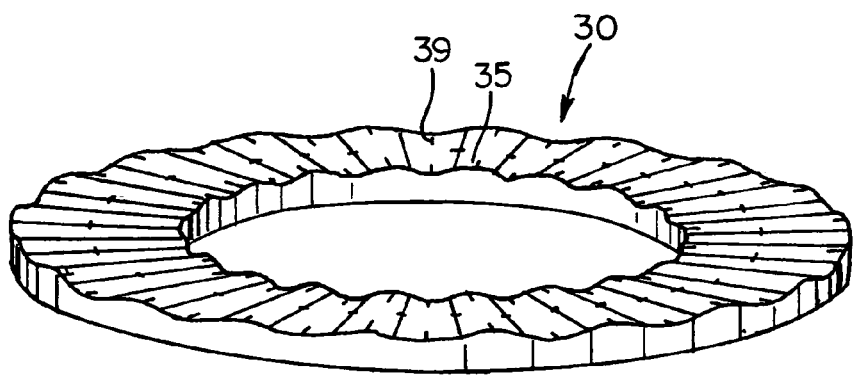
FIG. 3 is a view of the friction lining shown in FIG. 2.
Figure 4:
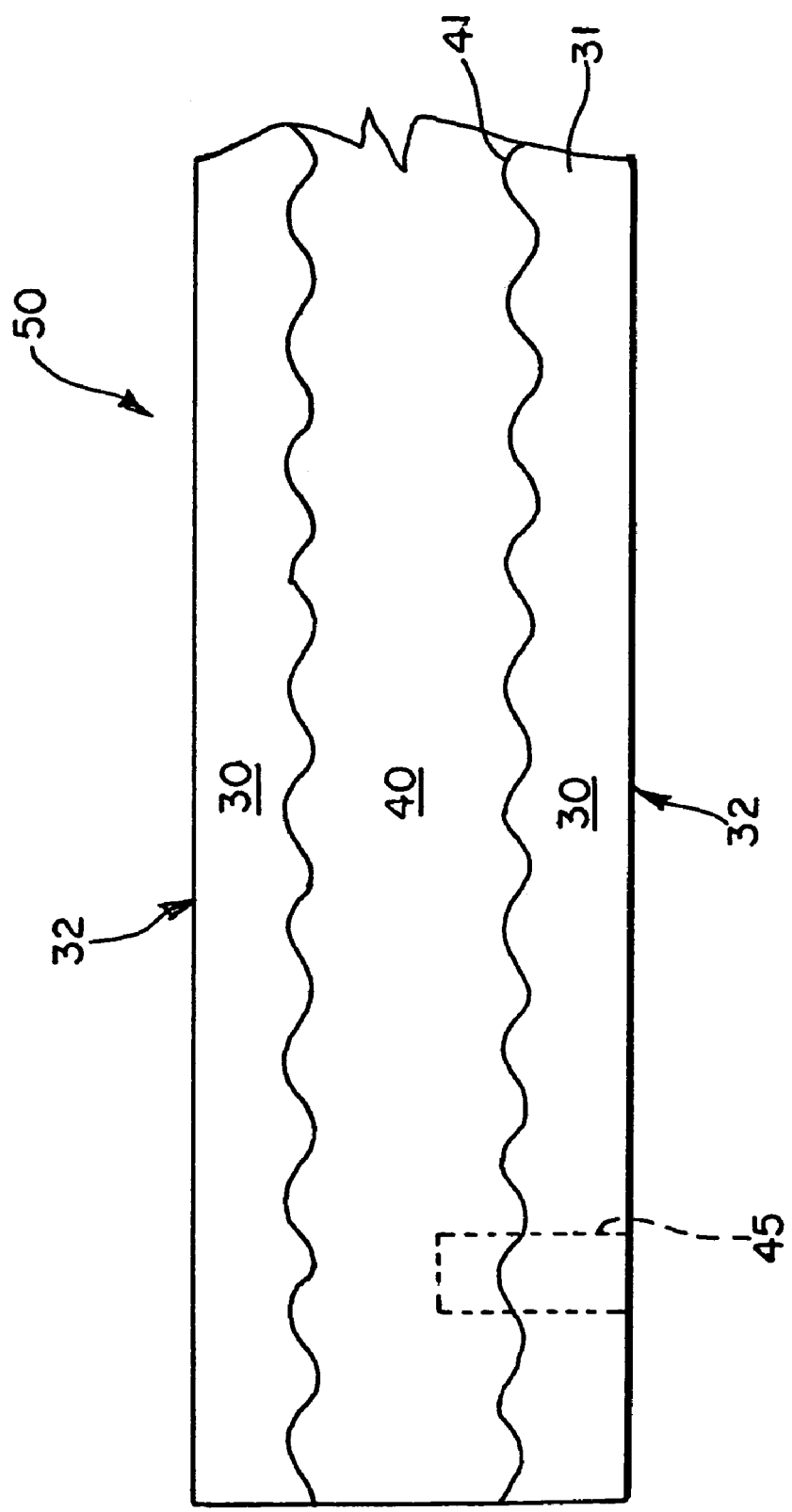
FIG. 4 is a cross-sectional side view of a brake disc assembly according to an embodiment of the present invention.

FIG. 2 is plan view of a sinusoidally-shaped friction lining 30 according to an embodiment of the present invention. FIG. 3 is a view of the friction lining 30 shown in FIG. 2. FIG. 4 is a cross-sectional side view of a brake disc assembly 50 according to an embodiment of the present invention.

As seen in the accompanying drawings, a pair of friction linings 30 are secured to a reusable structural core 40. Each friction lining disc 30 is provided with a sinusoidally-shaped mounting surface 31 and a relatively flat, wear surface 32. The structural core disc 40 will have at least one sinusoidally-shaped mounting surface 41 corresponding to the sinsusoidally-shaped mounting surface 31 of the friction lining disc 30. A structural core 40 for a pressure plate will normally only have one mounting surface, while individual stator or rotor disc assemblies will have structural cores 40 having two mounting surfaces.

The structural core 40 can be used over many tours of duty. The friction lining discs 30, which are inexpensive to manufacture, can be discarded or refurbished as necessary. An inherent advantage of the present invention is that the friction lining/structural core configuration results in the drive mechanism transferring friction torque from the lining rings 30 to the structural core 40 via the interlocking sinusoidal wave patterns.

The composite brake disc assembly 50 is assembled by attaching two friction lining discs 30 on both sides of the structural core disc 40 via rivets, clips, or other mechanical locking mechanism, to ensure that the sinusoidal waves on both surfaces are engaged and transfer shear forces from one disc to another. A rivet, screw or other mechanical fastener 45 can be used to secure the friction lining discs 30 to their respective structural core 40.

The sinusoidal waves on both discs interlock or engage to transfer shear forces between the discs. An inherent advantage of the present invention is that the sinusoidal wave patterns provide an increased surface area that ensures a larger contact zone between the structural core 40 and an adjacent friction lining 30. In the background art, the relatively flat mounting surfaces are engaged along a relatively small surface area defined simply by the width and height of the contact zone. However, the sinusoidal wave patterns of the present invention provide a larger surface area since the mating surfaces are inclined and continuous. Therefore, the present invention will ultimately provide a larger bearing surface for providing more uniform load distribution between the lining and core, including an improved transfer of compressive braking forces through shear loading.

The sinusoidal wave patterns also ensure proper positioning of the friction lining discs 30 relative to the structural core 40 by preventing relative movement between the structural core 40 and friction lining discs 30 held in interlocking engagement. Accordingly, the friction lining discs 30 are prevented from rotating relative to the structural core and thereby improve dynamic stability of the brake discs during force transfer. However, some relative motion could occur during braking, and the energy dissipated may improve the dynamic stability of the brake discs.

As seen in FIG. 2 and FIG. 3, each sinsusoidal wave pattern inherently includes crests 35 and troughs 39. The crests 35 and the troughs 39 of each sinusoidal wave pattern occur at positions of maximum and minimum amplitude, respectively. Along each crest 35 of the sinusoidal wave patterns, radially-extending, imaginary ridge lines 36 are formed.

Due to the annular shape of each friction lining disc 30 and structural core, the wavelengths of the sinusoidal pattern will increase as the ridge lines 36 extend radially outward. For example, a first arc length 37 measured between adjacent ridge lines 36 along the circumference of the friction lining disc 30 or structural core 40 will be longer than a second arc length 38 measured between the same ridge lines 36, but at a position along the inner diameter of the friction lining disc 30.

The friction lining discs 30 can be made of several types of carbon—carbon composite coupled with the reusable structural core disc 40 also made of a type of carbon—carbon composite material. Although both the friction lining discs 30 and structural core 40 could be made out of the same or similar carbon—carbon composite materials, the present invention is particularly advantageous in that separate materials optimized for the separate functions of the linings 30 and core 40 can be incorporated into the design.

The structural core 40 is machined out of strength-optimized carbon—carbon composite material with drive lugs on the inner and outer diameters for the stator and rotor application, respectively. In a preferred embodiment, sinusoidal wave patterns are provided on both contact surfaces that otherwise are flat according to the background art.

Friction lining discs 30 are machined out of friction/wear optimized carbon—carbon composite material with the sinusoidal wave pattern machined from the non-friction flat surface. In revenue service, worn friction lining elements are discarded or recycled while the structural core is reused for a large number of tours of duty. Accordingly, material cost of the brake disc assembly 50 can be optimized as higher quality structural cores 40 can be incorporated into the assembly 50. Friction lining discs 30 requiring replacement can be simply removed from the structural core 40, and a replacement or refurbished friction lining disc 30 can be secured to the structural core 40.

Carbon—carbon composites are high-temperature materials that are used for heat sinks in high temperature/severe environments for aircraft brakes, and for other aerospace applications that require their unique properties. Carbon—carbon composites have low density, high strength and high modulus. These properties are retained to temperatures above 2000° C. Creep resistance and toughness are also high, and the high thermal conductivity and low thermal expansion coefficient provide thermal shock resistance.

Accordingly, the friction/wear optimized carbon—carbon composite used for the friction lining discs 30 of the present invention, will typically demonstrate a higher friction coefficient than that of the strength-optimized structural core. The structural core 40 may have a higher strength to fracture, tensile strength, and/or compressive strength than the friction lining discs 30. The friction lining discs 30 and structural core 40 can be manufactured and/or machined from well known technology for the fabrication of carbon—carbon composite devices.

The material properties of a carbon—carbon composite can vary depending on the fiber fraction, fiber type selected, textile weave type and similar factors, and the individual properties of the fibers and matrix material. Fiber properties will depend on materials utilized, production process, and/or degree of graphitization and orientation.

Further examples of suitable carbon/carbon composite materials and their desired material properties, potential applications of the present invention, and additional features of aircraft braking systems of the background art are described in the following U.S. Pat. Nos. 4,804,071 to Schultz et al.; 5,558,186 to Hyde et al.; and U.S. Pat. No. 5,779,006, the entirety of each of which are hereby incorporated by reference.

Various well known mechanical fastening devices such as clamps, holding blocks, rivets, screws, and retainer clips can be readily incorporated into the present invention. Although friction lining discs 30 can be bonded to the structural core 40 of the present invention, it will likely be more advantageous to utilize mechanical fastening devices.

As described hereinabove, the present invention provides a greatly increased surface area along the contact zone located between the friction lining discs 30 and the structural core 40. Loading that would normally be transferred through mechanical fasteners or other surrounding structure can now be directly transferred through the lining and structural core. Since the material properties of each component can be optimized independently, the present invention achieves idealized heat transfer, friction/wear resistance and structural support/strength.

Accordingly, it will be readily appreciated by one of skill in the art that alternative patterns, such as interlocking triangular or trapezoidally shaped mounting surfaces, can be employed along the contact zone between the structural core 40 and friction lining discs 30. Further, protective coatings such as thermal barrier coatings or antioxidants can be applied to the wear surfaces 32 of the friction lining discs 30.

Figure 5:
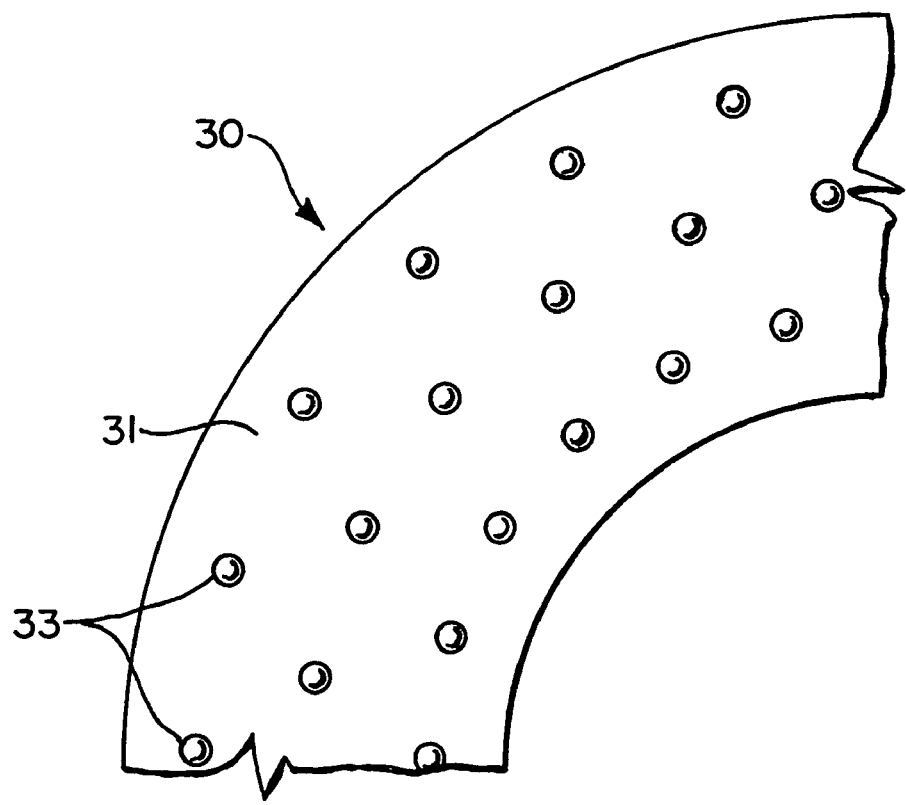
FIG. 5 is a partial, sectional view of a friction lining according to another embodiment of the present invention.
Figure 6:
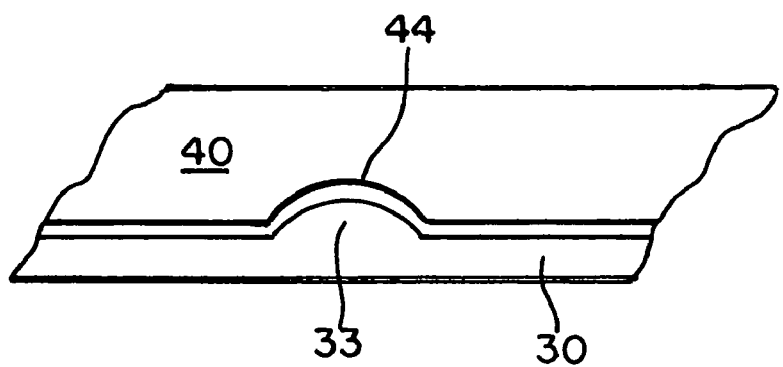
FIG. 6 is a cross-sectional side view of a structural core matingly engaging a frictional lining.

FIG. 5 is a partial, sectional view of a friction lining according to a second embodiment of the present invention. FIG. 6 is a cross-sectional side view of a structural core 40 matingly engaging a frictional lining disc 30 according to this second embodiment.

A second embodiment of the present invention incorporates the use of a plurality of dimples 33 formed on the mounting surface 31 of the friction linings 30 and matingly engaging a plurality of corresponding recesses 44 formed on the mounting surface 41 of the structural core 40. This dimple 33 and recess 44 arrangement is an alternative technology for accomplishing the increased surface area of the contact zone between the structural core 40 and friction lining discs 33.

Although it is preferred to have the dimples 33 formed on the friction lining discs 30 for ensuring structural integrity of the friction lining discs 30, one of skill in the art will appreciate that the dimples 33 and recesses 44 can be formed on the structural core 40 and friction lining discs 30, respectively.

The present invention can further incorporate other combinations of dimpled and/or generally, wave shaped patterns to increase the surface area that will provide a larger bearing surface for improving transfer of compressive braking forces through shear loading.

What is claimed is:

1. A friction disk for a brake assembly comprising:
an annular structural core having a first sinusoidally-shaped mounting surface and a second sinusoidally-shaped mounting surface;
a first frictional lining disk having an annular and sinusoidally-shaped mounting surface and a relatively, flat wear surface on an opposite side of said first frictional lining disk from said sinusoidally-shaped mounting surface of said first frictional lining disk, said mounting surface of said first frictional lining disk matingly and directly engaging said first mounting surface of said structural core; and
a second frictional lining disk having an annular and sinusoidally-shaped mounting surface and a relatively, flat wear surface on an opposite side of said second frictional lining disk from said sinusoidally-shaped mounting surface of said second frictional lining disk, said mounting surface of said second frictional lining disk matingly and directly engaging said second mounting surface of said structural core.

2. The friction disk according to claim 1, further comprising drive lugs on an inner diameter of said structural core for mounting to a stator of the brake assembly.

3. The friction disk according to claim 1, further comprising drive lugs on an outer diameter of said structural core for mounting to a rotor of the brake assembly.

4. The friction disk according to claim 1, wherein each friction lining disk is formed from friction optimized carbon-carbon composite.

5. The friction disk according to claim 1, further comprising at least one mechanical fastener securing each friction lining disk to said structural core.

6. The friction disk according to claim 1, wherein each wear surface includes a thermal barrier coating.

7. The friction disk according to claim 1, wherein said annular structural core is formed from strength-optimized carbon-carbon composite.

8. The friction disk according to claim 1, further comprising drive lugs on at least one of an inner diameter of said structural core for mounting to a stator of the brake assembly and an outer diameter of said structural core for mounting to a rotor of the brake assembly.

9. A brake assembly comprising:
   a torque tube for attaching to an axle of a wheel;
   a disk stack formed by an alternatively arranged plurality of stator and rotor disks; and
   a housing containing pressure piston devices for compressing the disk stack of stator and rotor discs, wherein at least one disk within said disk stack includes a friction disk, said friction disk having:
      an annular structural core having a first sinusoidally-shaped mounting surface and a second sinusoidally-shaped mounting surface;
      a first frictional lining disk having an annular and sinusoidally-shaped mounting surface and a relatively, flat wear surface on an opposite side of said first frictional lining disk from said sinusoidally-shaped mounting surface of said first frictional lining disk, said mounting surface of said first frictional lining disk matingly and directly engaging said first mounting surface of said structural core; and
      a second frictional lining disk having an annular and sinusoidally-shaped mounting surface and a relatively, flat wear surface on an opposite side of said second frictional lining disk from said sinusoidally-shaped mounting surface of said second frictional lining disk, said mounting surface of said second frictional lining disk matingly and directly engaging said second mounting surface of said structural core.

10. The brake assembly according to claim 9, wherein said annular structural core is formed from strength-optimized carbon-carbon composite.

11. The brake assembly according to claim 9, further comprising drive lugs on at least one of an inner diameter of said structural core for mounting to a stator of the brake assembly and an outer diameter of said structural core for mounting to a rotor of the brake assembly.

12. A disk stack for a brake assembly, wherein the disk stack is formed by an alternatively arranged plurality of stator and rotor disks, said disk stack comprising:
   at least one friction disk within said disk stack, said friction disk having:
      an annular structural core having a first sinusoidally-shaped mounting surface and a second sinusoidally-shaped mounting surface;
      a first frictional lining disk having an annular and sinusoidally-shaped mounting surface and a relatively, flat wear surface on an opposite side of said first frictional lining disk from said sinusoidally-shaped mounting surface of said first frictional lining disk, said mounting surface of said first frictional lining disk matingly and directly engaging said first mounting surface of said structural core; and
      a second frictional lining disk having an annular and sinusoidally-shaped mounting surface and a relatively, flat wear surface on an opposite side of said second frictional lining disk from said sinusoidally-shaped mounting surface of said second frictional lining disk, said mounting surface of said second frictional lining disk matingly and directly engaging said second mounting surface of said structural core.

* * * * *